J. M. SCHELLER.
AUTOMOBILE SIGNAL.
APPLICATION FILED JULY 26, 1921.
1,428,260.
Patented Sept. 5, 1922.
3 SHEETS—SHEET 3.
Fig. 3.
Fig. 4.
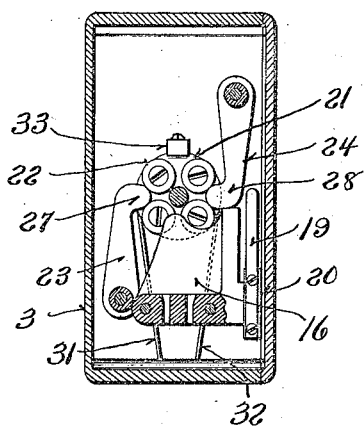
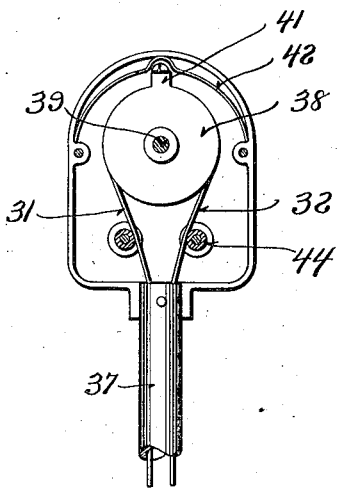
Fig. 5.
Fig. 6.
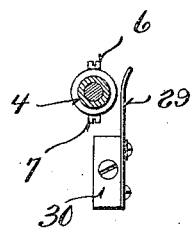
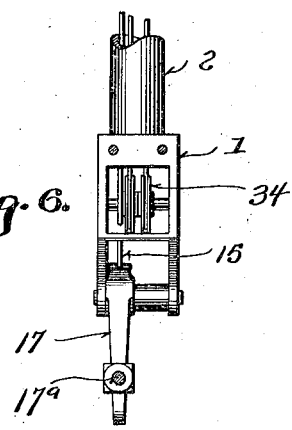
Witness:
Robert E. Weber
Inventor:
John M. Scheller
Young & Young
Attorneys Patented Sept. 5, 1922.

1,428,260

UNITED STATES PATENT OFFICE.

JOHN M. SCHELLER, OF MILWAUKEE, WISCONSIN, ASSIGNOR TO RELIABLE AUTO SIGNAL COMPANY, OF MILWAUKEE, WISCONSIN, A CORPORATION OF WISCONSIN.

AUTOMOBILE SIGNAL.

Application filed July 26, 1921. Serial No. 487,663.

*To all whom it may concern:*

Be it known that I, JOHN M. SCHELLER, a citizen of the United States, and resident of Milwaukee, in the county of Milwaukee and State of Wisconsin, have invented certain new and useful Improvements in Automobile Signals; and I do hereby declare that the following is a full, clear, and exact description thereof.

My invention relates to new and useful improvements in signal devices adapted particularly for use on automobiles or other vehicles whereby to indicate visually the intention of the driver of a vehicle with respect to stopping or turning the vehicle whereby the drivers of the following vehicles may be appraised of such intention, the present device being of that type including manual means for operating the signal members.

It is the general object of my invention to simplify and otherwise improve the structure of the means by which these devices are operated and to increase the efficiency thereof.

With the foregoing in view the invention consists in a pair of pivotally supported signal members, one of which is to indicate stopping of the vehicle while the other which is in the form of an arrow is adapted to oscillate from a vertical position to either the right or left. Mounted on the respective shafts of the signal members are a pair of sheaves from which are trained cables connected with manually controlled operating levers for the purpose of actuating the signals to signify the intention of the driver.

In the accompanying drawings,

Figure 3 is a vertical sectional view on the line 3—3 of Figure 2.

Figure 4 is a sectional detail view of the mechanism from which one of the signals is operated.

Figure 5 is a sectional detail view on the line 5—5 of Figure 2, and

Figure 6 is a transverse sectional view on the line 6—6 of Figure 2.

Figure 1:
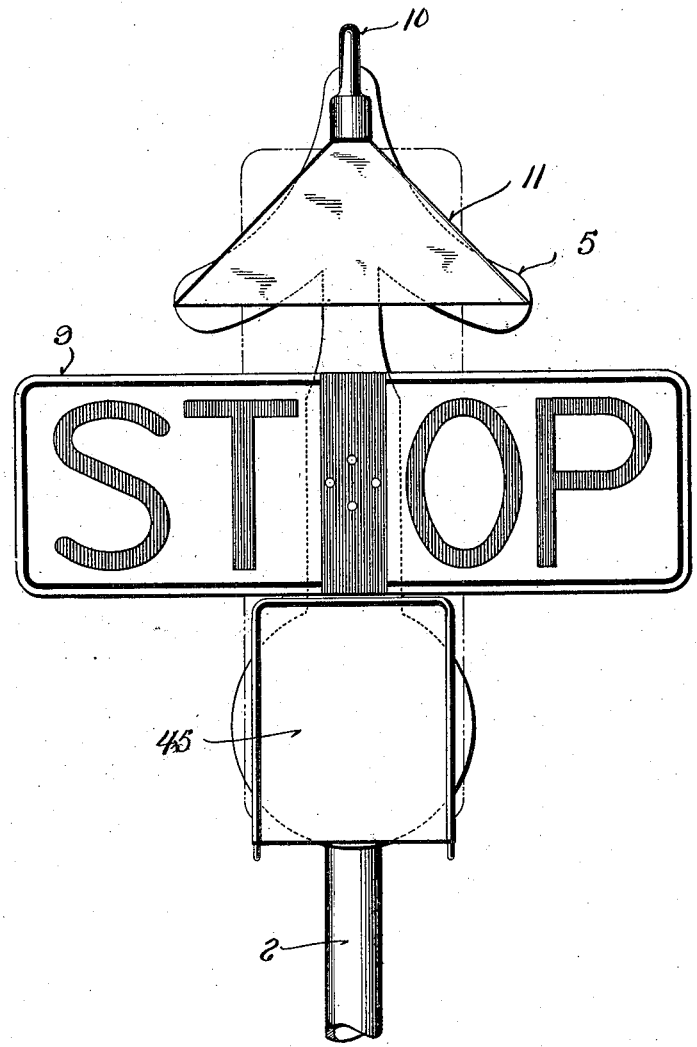
Figure 1 is a front elevation of the signal elements.

Referring specifically to the drawings, the numeral 1 represents a bracket and housing which is attached at the rear end of an automobile to which is secured the hollow standard 2 which carries a casing 3 at its upper end. Journalled in the casing, is a sleeve 4 which carries at its rear end, outside of the casing, a signal element 5, which is preferably in the shape of an arrow, as shown, and is adapted to be rocked to the right or left to denote the intention of the driver to make a right or left turn.

The signal member 5 is secured to the sleeve 4 by means of oppositely disposed set screws 6 and 7, which also serve as contact points to form a circuit through the lamp for illuminating the signal whenever same is thrown to operative position.

Journalled within the sleeve 4 is a shaft 8 which carries at its rear end, another signal element 9 which may be operated to denote stop. Carried above the casing 3 is a goose neck 10 which is provided with a light casing 11 and an electric lamp 12 therein. The signal element 9 is normally held in its vertical or inoperative position, shown in dotted lines in Figure 1, by the coil spring 13. The means for rocking it to its horizontal or operative position comprises a sheave 14, secured to the shaft 8 and a cable 15 which is attached at one end to the sheave and passes downwardly over the guideway 16 and through the hollow standard 2, the lower end of the cable being secured to one arm of a bell crank 17 which is journalled in the bracket 1. The other arm of the bell crank is adjustably secured to a forwardly extending rod 17ª which may be secured at its other end to the brake pedal to be operated thereby, whenever the brake is applied.

When the signal element 9 and shaft 8 are rocked to denote the intention of the driver to stop, a contact point 18 which is carried by the sheave 14 forms a contact with the blade 19 carried by the block 20. This establishes a circuit through the lamp 12 in a manner well known.

Figure 2:
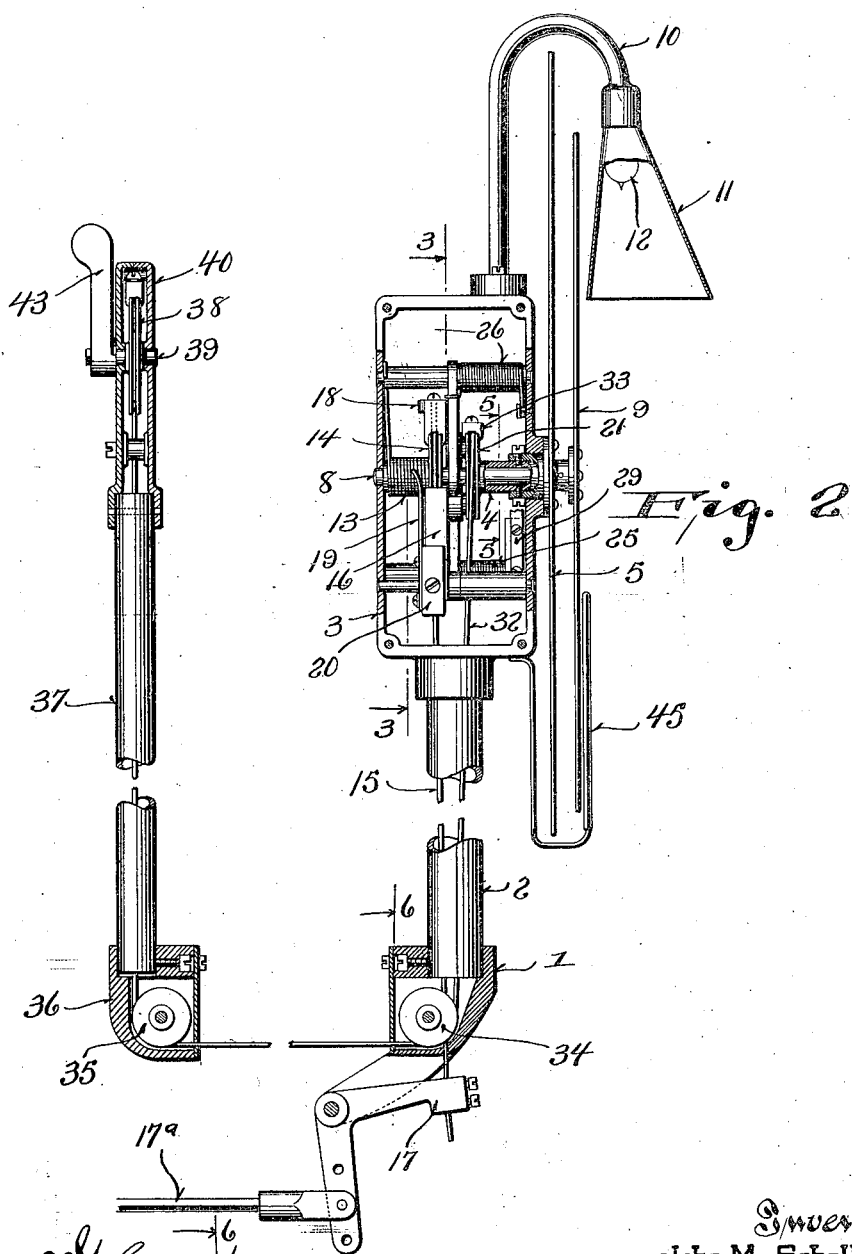
Figure 2 is a longitudinal sectional view through the mechanism for operating the same.

The sleeve 4 and signal element 5 are normally in the position shown in Figure 1. The sleeve 4 at its inner end carries a detent which comprises a disk 21 and four buttons 22. Dogs 23 and 24 are mounted within the casing 3 and are held by the respective springs 25 and 26 so that their rounded noses 27 and 28 will engage between the buttons 22 to hold the sleeve and signal element normally in its inoperative position, as shown in Figures 2 and 3.

When the sleeve is rotated in either direction, the rounded noses of the dogs will permit the same to ride over the buttons 22 and upon reaching an angle of 90° in either direction, the noses of the dogs will again drop between the buttons and hold the sleeve and the corresponding signal in this position. When the signal element has been turned to operative position, one of the set screws 6 or 7 will contact with the blade 29 on the block 30, and complete a circuit through the lamp 12, as will be readily understood.

The means for rocking the sleeve 4 in either direction comprises the cables 31 and 32 which are roven around opposite sides of a disk or sheave 21, secured to the sleeve 4 and the upper ends of the cables are secured to the sheave by a clip 33. The cables 31 and 32 extend downwardly from the sheave 21 through the tube 2 around the sheaves 34 and thence around the sheaves 35 which are journalled in a bracket 36 near the forward end of the vehicle. The cables extend thence upwardly through a tube 37 to a sheave 38, which is secured on a shaft 39 journalled in a casing 40 located near the steering wheel. The sheave 38 is provided with a lug 41, which cooperates with the bolt spring 42 within the casing 40, to maintain the same normally in the position shown in Figure 4, with the signal 5 in inoperative position, as shown in Figure 1.

In order to throw the signal to operative position, an arm 43 is provided on the shaft 39 by means of which the latter may be turned to the right or left as may be desired. When so turned, the lug 41 will frictionally engage the spring 42 to hold the sheave 43 in the position to which it is adjusted. Guide rollers 44 are provided below the sheave 33, in order to guide the cables in their movement up and down in the tube 37, to prevent an excessive amount of friction.

From the foregoing description, it will be seen that I have provided a convenient and efficient means for notifying motorists in the rear of an intention to stop or to turn to the right or left. The stop signal will, as above explained, be operated automatically whenever the brake pedal is depressed. The signal 5 denoting right or left turn may be readily operated by means of the lever 43. The lamp 12 will be illuminated whenever either one of the signals is turned to horizontal or active position. Both signal devices when in vertical position will be substantially concealed from view by the light casing 11 and the housing plate 45, which is secured to the casing 3 and extends around the lower ends of the signal devices, as shown in Figure 2.

What I claim is:

1. A signal device comprising a casing, a shaft journalled in said casing, a signal element on the shaft outwardly of the casing, a sleeve fitted over said shaft and carrying a second signal element, sheaves mounted on said shaft and sleeve respectively, and cables trained over the respective sheaves and connected thereto for oscillating the signal members to the desired position.

2. A signal device comprising a casing, a shaft journalled in said casing, a signal element on the shaft outwardly of the casing, a sleeve fitted over said shaft and carrying a second signal element, a sheave mounted on the shaft and having a cable connected thereto for oscillating the signal element carried thereby in one direction a spring connected to the shaft to automatically restore it to normal position, a sheave mounted on the sleeve and having a pair of cables connected therewith to oscillate the second signal element in either direction and means for yieldably retaining the same in its adjusted position.

3. A signal element comprising a casing, a shaft journalled in the casing, a signal element carried by the shaft outside of the casing, means for connecting the shaft to the brake pedal to be operated thereby to rock said shaft and signal element in one direction, a spring for returning the shaft and signal element to normal position, a sleeve surrounding said shaft and carrying a second signal element, means for rocking said sleeve and second signal element in either direction, a detent carried by said sleeve and yieldably held dogs cooperating with said detent to yieldably hold said sleeve and second signal element in normal position or at an angle of 90° on either side of its normal position.

4. A signal device comprising a casing, a shaft journalled in said casing, a signal element carried by the shaft outwardly of the casing, a sleeve fitted over said shaft and carrying a second signal element, sheaves mounted on said shaft and sleeve, cables trained over said sheaves and connected thereto for oscillating the signal members to the desired position, and means for illuminating either one of said signal elements when it has been oscillated through an arc of 90°.

In testimony that I claim the foregoing I have hereunto set my hand at Milwaukee, in the county of Milwaukee and State of Wisconsin.

JOHN M. SCHELLER.